United States Patent
Jiang

(10) Patent No.: US 12,089,265 B2
(45) Date of Patent: *Sep. 10, 2024

(54) METHODS AND APPARATUSES FOR REQUESTING SYSTEM INFORMATION

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,467

(22) Filed: Feb. 22, 2023

(65) Prior Publication Data

US 2023/0199858 A1    Jun. 22, 2023

Related U.S. Application Data

(63) Continuation of application No. 17/368,175, filed on Jul. 6, 2021, now Pat. No. 11,612,000, which is a
(Continued)

(51) Int. Cl.
*H04W 74/0833* (2024.01)
*H04L 5/00* (2006.01)
(Continued)

(52) U.S. Cl.
CPC ....... *H04W 74/0833* (2013.01); *H04L 5/0048* (2013.01); *H04W 48/14* (2013.01);
(Continued)

(58) Field of Classification Search
None
See application file for complete search history.

(56) References Cited

U.S. PATENT DOCUMENTS

| 10,764,796 B2 | 9/2020 | Karout et al. |
| 10,834,759 B2 | 11/2020 | Loehr et al. |

(Continued)

FOREIGN PATENT DOCUMENTS

| CN | 101572594 A | 11/2009 |
| CN | 101695196 A | 4/2010 |

(Continued)

OTHER PUBLICATIONS

ISA State Intellectual Property Office of the People's Republic of China, International Search Report issued in Application No. PCT/CN2017/080713, Sep. 5, 2017, WIPO, 4 pages.

(Continued)

*Primary Examiner* — Hong S Cho
(74) *Attorney, Agent, or Firm* — Finnegan, Henderson, Farabow, Garrett & Dunner, L.L.P.

(57) ABSTRACT

A method for requesting system information, includes: sending a first random access request, wherein the first random access request carries at least one pilot code for identifying system information to be requested; monitoring a response message corresponding to the first random access request within a preset time period, wherein the response message carries information for responding to the at least one pilot code; and when the response message is detected, based on a pilot code identifier included in the response message, monitoring and receiving system information corresponding to the pilot code identifier within a transmission window of the system information corresponding to the pilot code identifier.

4 Claims, 12 Drawing Sheets

Related U.S. Application Data continuation of application No. 16/653,340, filed on Oct. 15, 2019, now Pat. No. 11,096,223, which is a continuation of application No. PCT/CN2017/080713, filed on Apr. 17, 2017.

(51) Int. Cl.
*H04W 48/14* (2009.01)
*H04W 48/16* (2009.01)
*H04W 74/00* (2009.01)
*H04W 76/27* (2018.01)

(52) U.S. Cl.
CPC ......... *H04W 48/16* (2013.01); *H04W 74/006* (2013.01); *H04W 76/27* (2018.02)

(56) References Cited

U.S. PATENT DOCUMENTS

| | | | |
|---|---|---|---|
| 2012/0165058 A1 | 6/2012 | Hwang et al. | |
| 2012/0287865 A1* | 11/2012 | Wu | H04W 74/006 370/329 |
| 2015/0319638 A1* | 11/2015 | Rune | H04W 74/002 370/229 |
| 2015/0358999 A1 | 12/2015 | Liu et al. | |
| 2016/0143059 A1* | 5/2016 | Jha | H04W 76/10 370/329 |
| 2017/0251500 A1 | 8/2017 | Agiwal et al. | |
| 2018/0288683 A1 | 10/2018 | Bendlin et al. | |

FOREIGN PATENT DOCUMENTS

| | | |
|---|---|---|
| CN | 101784121 A | 7/2010 |
| CN | 101827450 A | 9/2010 |
| CN | 101695196 B | 8/2011 |
| CN | 103765961 A | 4/2014 |
| CN | 106171011 A | 11/2016 |
| RU | 2586319 C2 | 6/2016 |
| RU | 2608589 C2 | 1/2017 |
| WO | WO 2011/084008 A2 | 7/2011 |
| WO | WO 2013/168776 A1 | 11/2013 |
| WO | WO 2015/005724 A1 | 1/2015 |
| WO | WO 2016/198909 A1 | 12/2016 |

OTHER PUBLICATIONS

Acquisition of Other-SI, InterDigital Communications, 3GPP TSG-RAN WG2 #95-BIS Tdoc R2-168464, Nov. 15, 2016, 4 pages.
Further consideration on the Other SI delivery in NR, ZTE, 3GPP TSG-RAN WG2 Meeting #96 R2-167844, Nov. 15, 2016, 5 pages.
Discussion on indicating the broadcast of on-demand SIBs, ITRI, 3GPP TSG-RAN WG2 Meeting #97 R2-1701345, Feb. 3, 2017, 3 pages.
$3^{rd}$ Generation Partnership Project; Technical Specification Group Radio Access Network; Evolved Universal Terrestrial Radio Access (E-UTRA); Medium Access Control (MAC) protocol specification; 3GPP TS 36.321 V15.4.0 (Dec. 2018).
$3^{rd}$ Generation Partnership Project; Technical Specification Group Radio Access Network; Evolved Universal Terrestrial Radio Access (E-UTRA); Radio Resource Control (RRC); Protocol specification; 3GPP TS 36.331 V15.4.0 (Dec. 2018).
ISA State Intellectual Property Office of the People's Republic of China, English translation of Written Opinion of the International Searching Authority of PCT Application No. PCT/CN2017/080713, mailed Sep. 5, 2017.
Extended European Search Report for Application No. 17906580.0, dated Mar. 25, 2020.
Fujitsu, Considerations of on-demand SI request, 3GPP TSG-RAN WG2 Meeting #97bis, Spokane, USA, Apr. 3-7, 2017, 4 pages.
Lenovo, Motorola Mobility, Details of On-demand SI requests, 3GPP TSG-RAN WG2 Meeting #97bis, Spokane, USA, Apr. 3-7, 2017, 4 pages.
Notice of Reasons for Refusal for corresponding Japanese Application No. JP 2020-505953, Dec. 4, 2020, 8 pages.
Notification of Reason for Refusal for corresponding Korean Application No. KR 10-2019-7033977, Dec. 28, 2020, 14 pages.
Indonesian Intellectual Property Office, Office Action Issued in Application No. P-00201909778, Jan. 22, 2021, 4 pages.
Qualcomm Incorporated, Delivery of System information, 3GPP TSG RAN WG2 ad-hoc, Spokane, USA , Jan. 17-19, 2017, 4 pages.
Examination Report dated Oct. 7, 2021, from the Indian Patent Office in counterpart Indian Application No. 201947046432.
Examination Report dated Nov. 3, 2021, from the European Patent Office in counterpart European Application No. 17906580.0.
European Patent Office, Extended European Search Report issued in Application No. 23158485.5, dated Jun. 7, 2023, 10 pages.

\* cited by examiner

METHODS AND APPARATUSES FOR REQUESTING SYSTEM INFORMATION

CROSS REFERENCE TO RELATED APPLICATIONS

The present application is a continuation application of U.S. application Ser. No. 17/368,175 filed on Jul. 6, 2021, which is a continuation application of U.S. application Ser. No. 16/653,340 filed on Oct. 15, 2019, now U.S. Pat. No. 11,096,223, which is a continuation application of International Application No. PCT/CN2017/080713 filed on Apr. 17, 2017, the entire contents of all of which are incorporated herein by reference.

TECHNICAL FIELD

The present disclosure relates to the field of communication technology, and in particular, to methods and apparatuses for requesting system information.

BACKGROUND

With the rapid development of wireless communication technology, the number of System Information (SI) of Long Term Evolution (LTE) increases, and sending SI of LTE in a periodic broadcast manner may cause more power consumption of a base station and a low utilization rate of spectrum resources. For a case that the number of User Equipment (UE) accessed is relatively less, sending SI of LTE in the periodic broadcast manner wastes resources. To relieve the problems of wasting resources and more power consumption of the base station caused by sending SI of LTE in the broadcast manner, telecom carriers begin to consider the way of sending SI by classification to solve the above problems.

In a research discussion of the 5th Generation mobile communication technology (5G for short) project, SI may be classified into a first type of SI and a second type of SI. The first type of SI may include SI associated with cell selection and cell access, and the second type of SI may include other SI except for the first type of SI. In the related art, the first type of SI may still be sent by broadcasting, and for the second type of SI, when a particular preamble for requesting the second type of SI sent by the UE through MSG 1 (a first message in a random access process) is received, the second type of SI may be broadcast within a transmission window of the second type of SI requested by the UE. But in the related art, sending the MSG 1 by the UE may fail due to low power for sending the MSG 1, which further causes that the base station does not broadcast the second type of SI because the request message sent by the UE is not received. In this case, the UE may only wait for a next SI period to re-request the second type of SI through the MSG 1, which results in a longer latency for the UE to obtain the SI and thus seriously affecting the performance.

SUMMARY

Embodiments of the present disclosure provide methods and apparatuses for requesting system information, so as to improve efficiency of requesting system information through a random access request, thereby avoiding a case that the system information is unsuccessfully received, or relatively long latency for obtaining system information when the random access request fails.

According to a first aspect of embodiments of the present disclosure, a method of requesting system information includes: sending a first random access request, wherein the first random access request carries at least one pilot code for identifying system information to be requested; monitoring a response message corresponding to the first random access request within a preset time period, wherein the response message carries information for responding to the at least one pilot code; and when the response message is detected, based on a pilot code identifier included in the response message, monitoring and receiving system information corresponding to the pilot code identifier within a transmission window of the system information corresponding to the pilot code identifier.

According to a second aspect of the embodiments of the present disclosure, a method of sending system information includes: receiving a random access request sent by user equipment, the random access request carrying at least one pilot code for identifying system information to be requested; generating a response message with a preset format based on the random access request; and sending the response message.

According to a third aspect of the embodiments of the present disclosure, user equipment (UE) includes: a processor; and a memory to store instructions executable by the processor; wherein the processor is configured to: send a first random access request, wherein the first random access request carries at least one pilot code for identifying system information to be requested; monitor a response message corresponding to the first random access request within a preset time period, wherein the response message carries information for responding to the at least one pilot code; and when the response message is detected, based on a pilot code identifier included in the response message, monitor and receive system information corresponding to the pilot code identifier within a transmission window of the system information corresponding to the pilot code identifier.

According to a fourth aspect of the embodiments of the present disclosure, a base station includes: a processor; and a memory to store instructions executable by the processor; wherein the processor is configured to: receive a random access request sent by user equipment, the random access request carrying at least one pilot code for identifying system information to be requested; generate a response message with a preset format based on the random access request; and send the response message.

The technical solutions provided in embodiments of the present disclosure may include the following beneficial effects.

When the UE sends the random access request carrying the pilot code of the to-be-requested system information to the base station, through the above technical solutions, if the system information is successfully requested, the UE may be controlled to monitor the to-be-requested system information within the transmission window of the system information successfully requested. In addition, when the to-be-requested system information is unsuccessfully requested, the to-be-requested system information is repeatedly requested through a random access request until the to-be-requested system information is successfully requested, so as to improve the efficiency of sending and receiving the system information between the base station and the user equipment, thereby avoiding long latency for the user equipment to obtain the system information, reducing the power consumption for the base station to send the system information, and increasing the utilization rate of the spectrum resources.

It shall be appreciated that the above general descriptions and the following detailed descriptions are merely illustrative and explanatory and do not limit the present disclosure.

BRIEF DESCRIPTION OF THE DRAWINGS

The accompanying drawings, which are incorporated in and constitute a part of this specification, illustrate the embodiments consistent with the present disclosure and, together with the description, serve to explain the principles of the disclosure.

DETAILED DESCRIPTION OF THE EMBODIMENTS

Figure 1A:
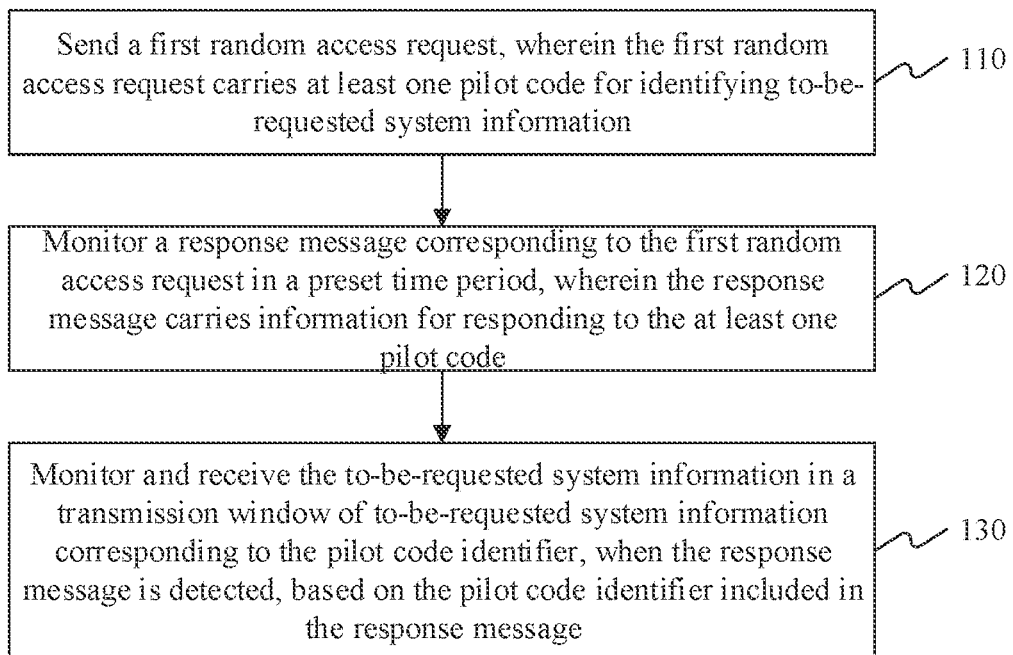
FIG. 1A is a flowchart illustrating a method of requesting system information according to an embodiment.

Embodiments will be described in detail here with the examples thereof illustrated in the drawings. Where the following descriptions involve the drawings, the same numerals in different drawings refer to the same or similar elements unless otherwise indicated. The implementation manners described in the following exemplary embodiments do not represent all implementation manners consistent with the present disclosure. Rather, they are merely examples of apparatuses and methods consistent with some aspects of the present disclosure as detailed in the appended claims.

The terminology used herein is for the purpose of describing particular embodiments only and is not intended to be limiting of embodiments. As used herein, the singular forms "a," "an," and "the," are intended to include the plural forms as well, unless the context clearly indicates otherwise. It will be further understood that the terms "comprises." "comprising," "includes," and/or "including," when used herein, specify the presence of stated features, integers, steps, operations, elements and/or components, but do not preclude the presence or addition of one or more other features, integers, steps, operations, elements, components and/or groups thereof.

Figure 1B:
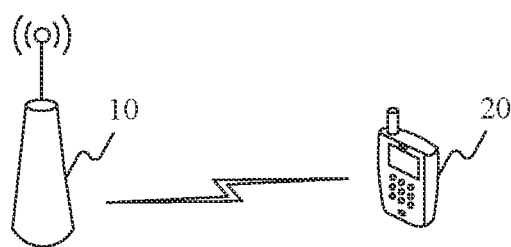
FIG. 1B is a scenario diagram illustrating a method of requesting system information according to an embodiment.

FIG. 1A is a flowchart illustrating a method of requesting system information according to an embodiment, and FIG. 1B is a scenario diagram illustrating a method of requesting system information according to an embodiment. The method of requesting system information may be applied to UE. As shown in FIG. 1A, the method of requesting system information includes the following steps 110-130.

At step 110, a first random access request is sent, wherein the first random access request carries at least one pilot code for identifying system information to be requested, also referred to as the to-be-requested system information.

In an embodiment, the first random access request is a first message MSG 1 in the random access process.

In an embodiment, a time-frequency resource of random access request may be obtained through a first type of system information broadcast by a base station, for example, the time-frequency resource of random access request is obtained through configuration information of a Physical Random Access Channel (PRACH) in a System Information Block 2 (SIB 2). The time-frequency resource of random access request may be determined through the related art.

In an embodiment, the to-be-requested system information belongs to a second type of system information, such as, System Information Block 12 (SIB 12).

In an embodiment, the pilot code of the to-be-requested system information is used to identify the to-be-requested system information, and the pilot code may be a preamble or an orthogonal code in other forms, which is not limited herein.

In an embodiment, one or more pilot codes may be carried in the first random access request.

At step 120, a response message corresponding to the first random access request is monitored within a preset time period, wherein the response message carries information for responding to the at least one pilot code.

In an embodiment, the preset time period may be a negotiated time length between the base station and the user equipment. The response message is returned within the preset time period after the MSG 1 is sent. If the user equipment receives the response message within the preset time period, it may be considered that no more response message will be received.

At step 130, when the response message is detected, based on a pilot code identifier included in the response message, to-be-requested system information corresponding to the pilot code identifier is monitored and received within a transmission window of the to-be-requested system information corresponding to the pilot code identifier.

In an embodiment, the system information successfully requested may be determined based on the pilot code identifier contained in the response message. For example, if the first random access request carries pilot code 1 corresponding to to-be-requested system information 1, pilot code 2 corresponding to to-be-requested system information 2, pilot code 3 corresponding to to-be-requested system information 3, and the response message corresponding to the first random access request only includes the pilot code identifiers corresponding to the pilot code 1 and the pilot code 2, it may be determined that the system information successfully requested is the to-be-requested system information 1 and the to-be-requested system information 2.

In an embodiment, the response message corresponding to the first random access request is a Random Access Response (RAR) message.

In an embodiment, the UE may determine the transmission window of each piece of the to-be-requested system information through scheduling information carried in the first type of system information broadcast by the base station.

In an exemplary scenario, as shown in FIG. 1B, take the mobile network being the LTE network and the base station being an evolved node B (eNB) as an example for illustration.

In the scenario shown in FIG. 1B, eNB 10 and UE 20 are included, wherein the eNB 10 periodically broadcasts the first type of system information, and the UE 20 may determine a time-domain resource of random access request, a transmission window of to-be-requested system information, and a pilot code of to-be-requested system information when receiving the first type of system information. The UE 20 sends a first random access request carrying the pilot code of the to-be-requested system information on the time-domain resource of random access request. If the system information is determined to be successfully requested based on a response message responding to the first random access request, the UE 20 may monitor the system information within the transmission window of the system information successfully requested. If determining the system information is unsuccessfully requested based on the response message responding to the first random access request, the UE 20 may continue to send a second random access request on the time-domain resource of random access request until the to-be-requested system information is successfully requested or the time-domain resource is exhausted.

In the embodiment, through the above steps 110 to 130, when the UE sends the random access request carrying the pilot code of the to-be-requested system information to the base station, through the above technical solutions, the UE may be controlled to monitor the to-be-requested system information within the transmission window of the system information successfully requested when the system information is successfully requested, so as to improve efficiency of sending and receiving the system information between the base station and the user equipment, thereby avoiding long latency for the user equipment to obtain the system information, reducing the power consumption for the base station to send the system information, and increasing the utilization rate of the spectrum resources.

In an embodiment, the method of requesting system information may further include: receiving the to-be-requested system information within the transmission window of to-be-requested system information in response to determining that at least one part of the to-be-requested system information unsuccessfully requested is null.

In an embodiment, the method of requesting system information may further include: counting a number of requests for the to-be-requested system information, and when the number of requests is greater than a preset threshold, sending a network problem report message to a Radio Resource Control Layer, wherein the network problem report message is used for indicating the to-be-requested system information which exceeds the preset threshold of the random access request.

In an embodiment, determining the at least one part of the to-be-requested system information unsuccessfully requested based on the monitoring result within the preset time period includes, in response to determining that no response message corresponding to the random access request is received within the preset time period, determining that the at least one part of the to-be-requested system information unsuccessfully requested is all of the to-be-requested system information; and in response to determining that the response message corresponding to the random access request is received within the preset time period, determining that the at least one part of the to-be-requested system information unsuccessfully requested is a part of the to-be-requested system information, wherein the part of the to-be-requested system information is not responded by information which is carried in the response message and used for responding to the pilot code.

Therefore, the above methods provided by the embodiments of the present disclosure can improve the efficiency of sending and receiving the system information between the base station and the user equipment, thereby avoiding long latency for the user equipment to obtain the system information, reducing the power consumption for the base station to send the system information, and increasing the utilization rate of the spectrum resources.

Figure 2:
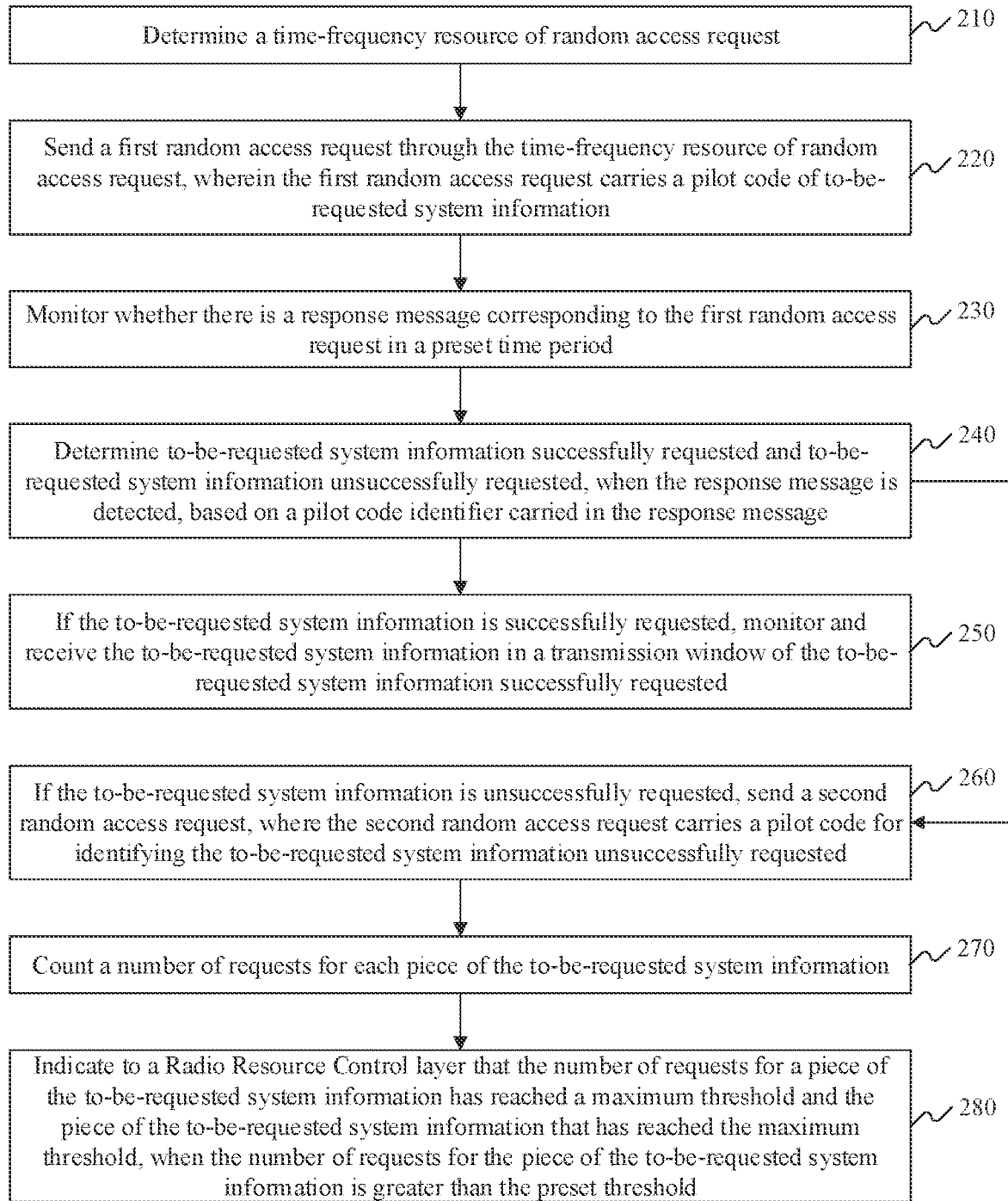
FIG. 2 is a flowchart illustrating a method of requesting system information according to an embodiment.

FIG. 2 is a flowchart illustrating a method of requesting system information according to an embodiment. In this embodiment, the UE requests to-be-requested system information through a random access request. As shown in FIG. 2, the method includes the following steps.

At step 210, a time-frequency resource of random access request is determined.

At step 220, a first random access request is sent through the time-frequency resource of random access request, wherein the first random access request carries a pilot code of to-be-requested system information.

At step 230, whether there is a response message corresponding to the first random access request is monitored within a preset time period.

At step 240, when the response message is detected, based on a pilot code identifier included in the response message, to-be-requested system information successfully requested and to-be-requested system information unsuccessfully requested are determined, and then step 250 and step 260 are performed.

In an embodiment, the monitoring result may be that no response massage is detected, and if so, at least one part of the to-be-requested system information unsuccessfully requested is all of the to-be-requested system information.

In an embodiment, the monitoring result is that the response message is detected, the at least one part of the to-be-requested system information unsuccessfully-requested is a part of the to-be-requested system information, wherein the part of the to-be-requested system information is responded by information which is carried in the response message and used for responding to the pilot code. If the response message carries the information of the pilot code for responding to all of the to-be-requested system information, the value of the at least one part of the to-be-requested system information unsuccessfully requested is null. If the response message carries the information of the pilot code for responding to a part of the to-be-requested system information, the value of the at least one part of the to-be-requested system information unsuccessfully requested is not null.

At step 250, if the to-be-requested system information is successfully requested, the to-be-requested system information is monitored and received within a transmission window of the system information successfully requested, and then the process ends.

At step 260, if the to-be-requested system information is unsuccessfully requested, a second random access request is sent, wherein the second random access request carries a pilot code for identifying the system information unsuccessfully requested.

In an embodiment, each piece of to-be-requested system information may correspond to multiple pilot codes, e.g., to-be-requested system information 1 may correspond to pilot code 11, pilot code 12, or pilot code 13.

In an embodiment, the pilot code of the to-be-requested system information unsuccessfully requested, which is carried in the second random access request, may be inconsistent with or consistent with the pilot code carried in the first random access request and corresponding to the to-be-requested system information. For example, when the to-be-requested system information 1 is unsuccessfully requested, if the pilot code of the to-be requested system information 1, which is carried in the first random access request, is the pilot code 11, the pilot code of the to-be-requested system information 1, which is carried in the second random access request may be the pilot code 12 or the pilot code 11.

In an embodiment, the UE may determine whether there is any to-be-requested system information unsuccessfully requested, which is requested by the second random access request, based on the response message responding to the second random access request, and the process is the same as the process of determining the part of the to-be-requested system information unsuccessfully requested, which is requested by the first random access request, based on the response message responding to the first random access request.

In an embodiment, if there is to-be-requested system information unsuccessfully requested after the UE sends the second random access request, the UE may continuously send the second random access request, until all of the to-be-requested system information is successfully requested or the time-domain resource of random access request is exhausted, wherein the pilot code carried in the second random access request sent later is the pilot code of the to-be-requested system information unsuccessfully requested.

At step 270, a number of requests for each piece of the to-be-requested system information is counted.

At step 280, when the number of requests for a piece of the to-be-requested system information is greater than a preset threshold, it is indicated to a Radio Resource Control layer that the number of requests for the piece of the to-be-requested system information has reached a maximum threshold and the piece of the to-be-requested system information that has reached the maximum threshold.

In an embodiment, the preset threshold of requests may be a system default value, such as 3 times.

In the embodiment, when determining that the request result of the to-be-requested system information is unsuccessfully requested, the UE may be controlled to repeatedly request the to-be-requested system information through the random access request until successfully requested, so as to improve the efficiency of sending and receiving the system information between the base station and the user equipment, thereby avoiding the long latency for the user equipment to obtain the system information, reducing power consumption for the base station to send the system information, and increasing the utilization rate of spectrum resources.

Figure 3:
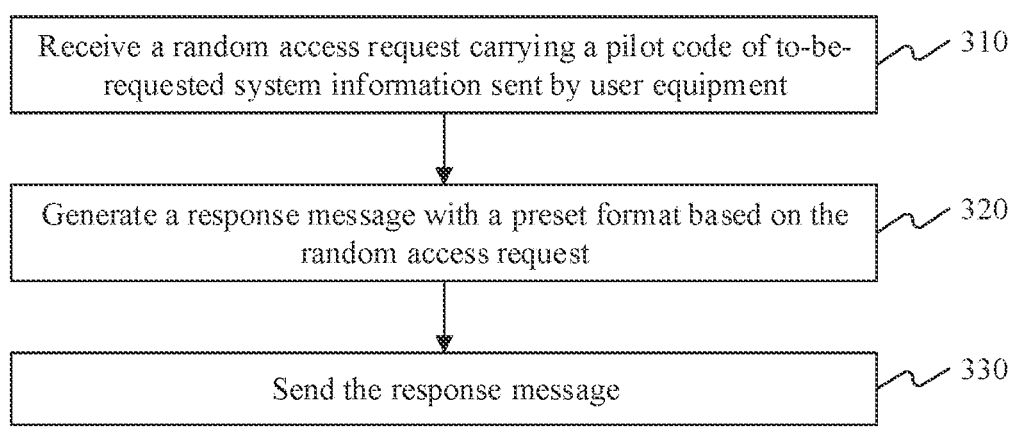
FIG. 3 is a flowchart illustrating a method of sending system information according to an embodiment.

FIG. 3 is a flowchart illustrating a method of sending system information according to an embodiment. The method of sending system information may be applied to eNB, and the embodiment is illustrated in combination with FIG. 1B. As shown in FIG. 3, the method of sending system information includes the following steps 310-330.

At step 310, a random access request carrying a pilot code of to-be-requested system information sent by user equipment is received.

At step 320, a response message with a preset format is generated based on a request message, i.e., the random access request.

In an embodiment, the preset format may be a format that only includes one or more sub-packet headers, but does not include a packet body. For example, the preset format does not include information such as Cell Radio Network Temporary Identifier (C-RNTI) of the UE. A pilot code identifier carried in the response message is carried by the sub-packet header. The method of generating the response massage in this preset format will be described below in FIG. 4.

In an embodiment, the preset format may be a format with a packet header and a packet body, wherein the packet header includes indicative information for indicating a number of the pilot codes in the packet body or indicating a length of the packet body. In an embodiment, the packet header may further include type indicative information for indicating a structure of the response message. The packet body may include one or more pilot code identifiers. The method of generating the response message in this preset format will be described below in FIG. 5.

At step 330, the response message is sent.

In an exemplary scenario, as shown in FIG. 1B, take the mobile network being the LTE network and the base station being an evolved node B (eNB) as an example for illustration. In the scenario shown in FIG. 1B, eNB 10 and UE 20 are included, wherein the eNB 10 periodically broadcasts the first type of system information, and the UE 20 may determine a time-domain resource of random access request, a transmission window of to-be-requested system information, and a pilot code of to-be-requested system information when receiving the first type of system information. The UE 20 sends a first random access request carrying the pilot code of the to-be-requested system information on the time-domain resource of random access request. If determining the to-be-requested system information is successfully requested based on a response message associated with the first random access request, the UE 20 may monitor the to-be-requested system information within the transmission window of to-be-requested system information that is successfully requested. If determining the to-be-requested system information is unsuccessfully requested based on the response message associated with the first random access request, the UE 20 may continue to send a second random access request on the time-domain resource of random access request until the to-be-requested system information is successfully requested or the time-domain resource is exhausted.

In the embodiment, through the above steps 310-330, when receiving a request message sent by UE through a time-frequency resource of random access request, the base station may generate the response message with the preset format to indicate whether the UE receives the to-be-requested system information within the transmission window of to-be-requested system information, so as to improve the efficiency of sending and receiving the system information between the base station and the UE.

In an embodiment, generating the response message with the preset format based on the request message includes: analyzing the pilot code of the to-be-requested system information from the request message; and obtaining the response message with the preset format by adding a pilot code identifier of the pilot code of the to-be-requested system information which is determined for response, to a sub-packet header of the response message.

In an embodiment, generating the response message with the preset format based on the request message includes: analyzing the pilot code of the to-be-requested system information from the request message; and obtaining the response message with the preset format by setting the number of pilot codes of the to-be-requested system information for response, or a length of a packet body of the response message in a packet header of the response message, and adding the pilot code identifier of the pilot code of the to-be-requested system information for response, to the packet body of the response message.

In an embodiment, the packet header of the response message further includes indicative information for indicating a structure type of the response message.

In an embodiment, the method of sending system information may further include: sending the to-be-requested system information for response, within the transmission window of to-be-requested system information.

Figure 4:
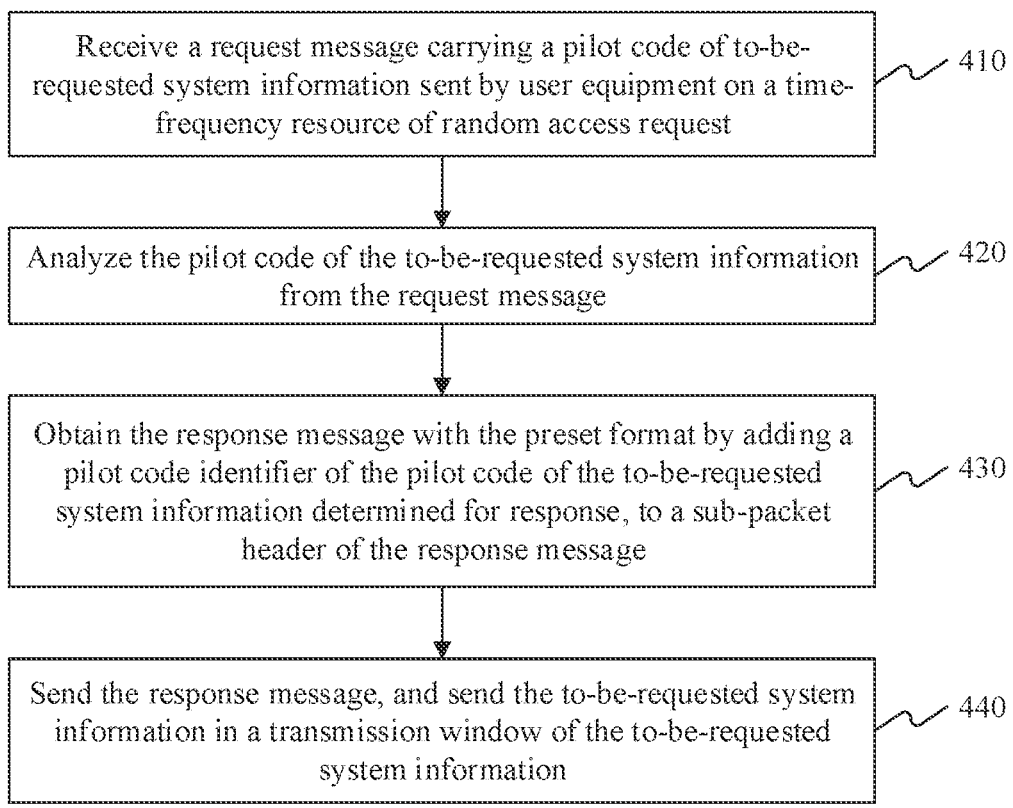
FIG. 4 is a flowchart illustrating a method of sending system information according to an embodiment.

FIG. 4 is a flowchart illustrating a method of sending system information according to an embodiment. As shown in FIG. 4, the method includes the following steps.

At step 410, a request message carrying a pilot code of to-be-requested system information sent by user equipment on a time-frequency resource of random access request is received.

At step 420, the pilot code of the to-be-requested system information from the request massage is analyzed.

At step 430, a response message with a preset format is obtained by adding a pilot code identifier of the pilot code of the to-be-requested system information which is determined for response, to a sub-packet header of the response message.

In an embodiment, the base station may determine the to-be-requested system information for response currently, and determine the pilot code identifier of the pilot code of the to-be-requested system information for response. In an embodiment, a pilot code identifier may be added to each sub-packet header; and in another embodiment, multiple pilot code identifiers can be added to one sub-packet header.

In an embodiment, since the preset format does not include a packet body, after determining the sub-packet header of the response message based on the pilot code of the to-be-requested system information, the response message with the preset format may be obtained.

At step 440, the response message is sent, and the to-be-requested system information is sent within a transmission window of the to-be-requested system information.

In an embodiment, the base station may send the to-be-requested system information for response more than once within the transmission window of to-be-requested system information.

In the embodiment, the base station may generate the response message according to the preset format to implement the request of the to-be-requested system information, so as to improve the efficiency of sending and receiving the system information between the base station and the user equipment.

Figure 5:
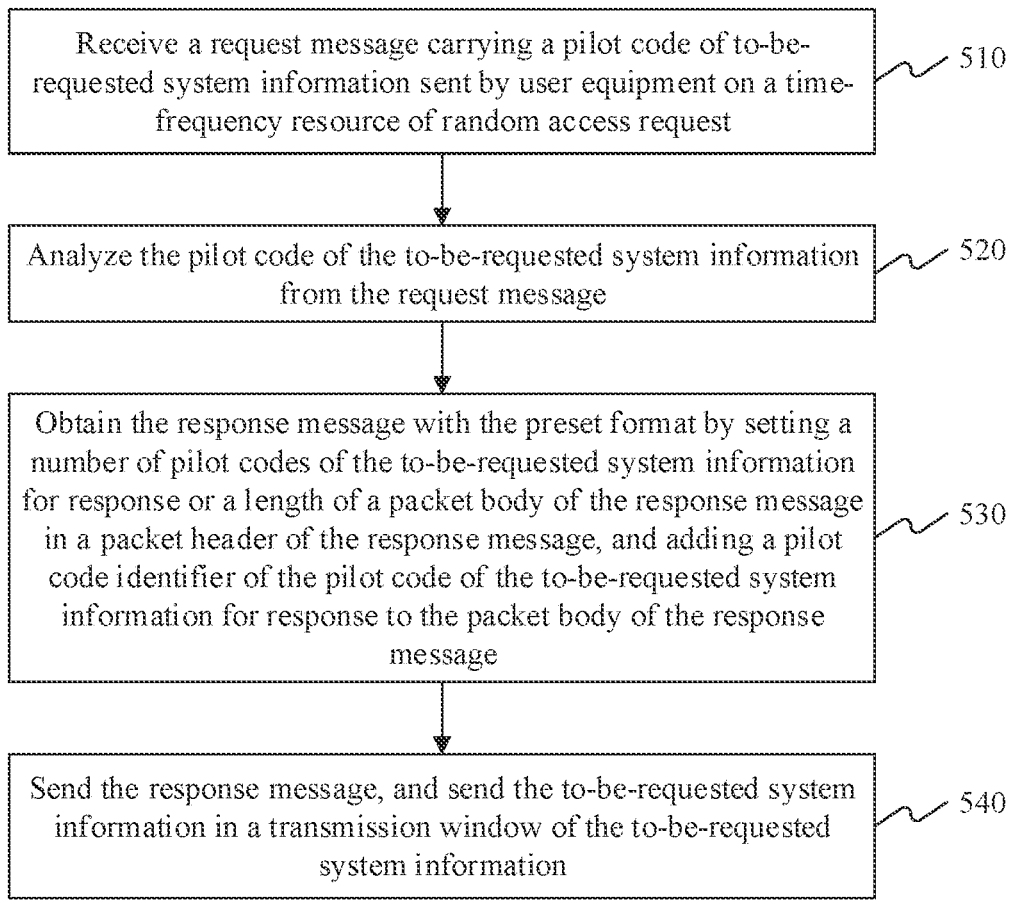
FIG. 5 is a flowchart illustrating a method of sending system information according to an embodiment.

FIG. 5 is a flowchart illustrating a method of sending system information according to an embodiment. As shown in FIG. 5, the method includes the following steps.

At step 510, a request message carrying a pilot code of to-be-requested system information sent by user equipment on a time-frequency resource of random access request is received.

At step 520, the pilot code of the to-be-requested system information is analyzed from the request message.

At step 530, a response message with a preset format is obtained by setting a number of pilot codes of the to-be-requested system information for response or a length of a packet body of the response message in a packet header of the response message, and adding a pilot code identifier of the pilot code of the to-be-requested system information for response to the packet body of the response message.

In an embodiment, the base station may determine the to-be-requested system information for response currently, and determine the number of pilot codes of the to-be-requested system information for response, or a length of the packet body of the response message.

In an embodiment, the packet header of the response message further includes indicative information for indicating a structure type of the response message.

At step 540, the response message is sent, and the to-be-requested system information is sent within a transmission window of the to-be-requested system information.

In the embodiment, the base station may generate the response message according to the preset format to implement the request of the to-be-requested system information, so as to improve the efficiency of sending and receiving the system information between the base station and the user equipment.

Figure 6:
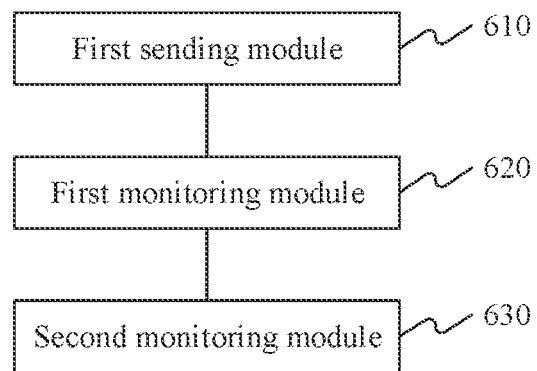
FIG. 6 is a block diagram illustrating an apparatus for receiving system information according to an embodiment.

FIG. 6 is a block diagram illustrating an apparatus for requesting system information according to an embodiment. The apparatus is applied to user equipment. As shown in FIG. 6, the apparatus for requesting system information includes: a first sending module 610, configured to send a first random access request, wherein the first random access request carries at least one pilot code for identifying to-be-requested system information; a first monitoring module 620, configured to monitor a response message corresponding to the first random access request within a preset time period, wherein the response message carries information for responding to the at least one pilot code; and a second monitoring module 630, configured to, when the response message is detected, based on a pilot code identifier included in the response message, monitor and receive to-be-requested system information corresponding to the pilot code identifier within a transmission window of the to-be-requested system information corresponding to the pilot code identifier.

Figure 7:
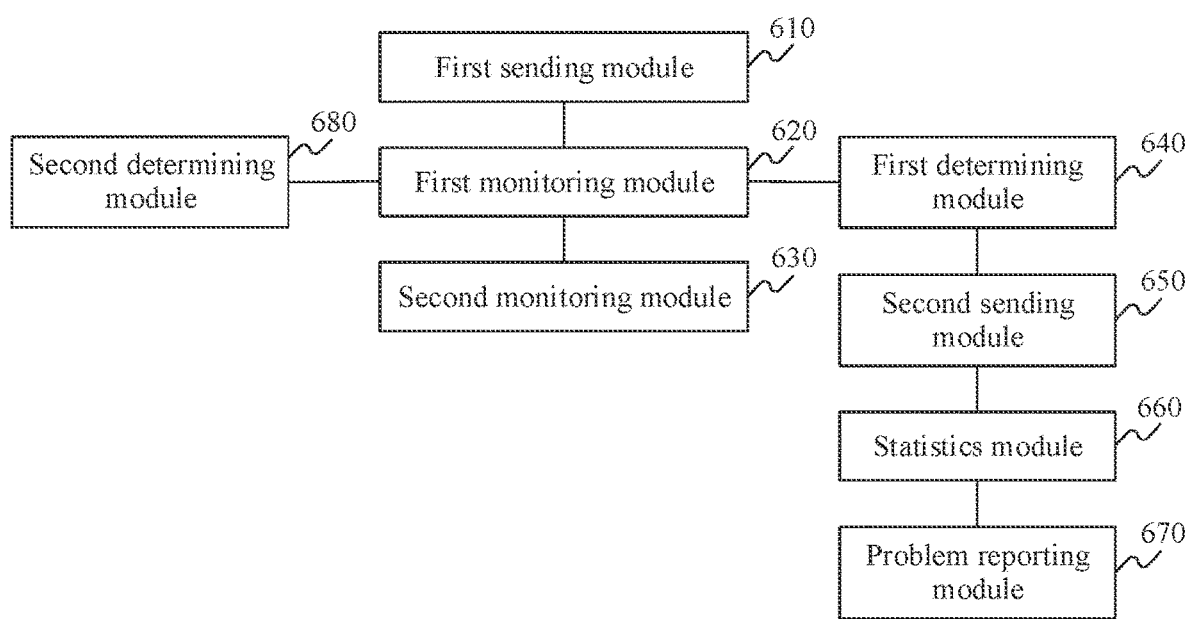
FIG. 7 is a block diagram illustrating an apparatus for receiving system information according to an embodiment.

FIG. 7 is a block diagram illustrating an apparatus for requesting system information according to an embodiment. As shown in FIG. 7, on the basis of the embodiment shown in FIG. 6, the apparatus further includes: a first determining module 640, configured to determine to-be-requested system information unsuccessfully requested based on the pilot code identifier included in the response message and the at least one pilot code carried in the first random access request for identifying the to-be-requested system information; and a second sending module 650, configured to send a second random access request, wherein the second random access request carries a pilot code of the to-be-requested system information that is unsuccessfully requested.

In an embodiment, the apparatus further includes: a statistics module 660, configured to count a number of requests for each piece of the to-be-requested system information; and a problem reporting module 670, configured to indicate to a Radio Resource Control (RRC) layer that the number of requests for a piece of the to-be-requested system information has reached a maximum threshold, when the number of requests for the piece of the to-be-requested system information is greater than a preset threshold.

In an embodiment, the apparatus further includes; a second determining module 680, configured to determine that none of the to-be-requested system information is successfully requested when no response message is detected.

Figure 8:
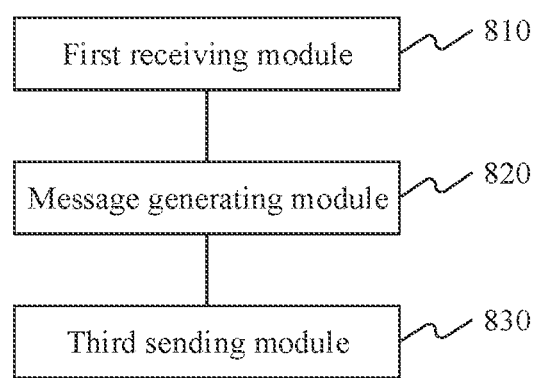
FIG. 8 is a block diagram illustrating an apparatus for sending system information according to an embodiment.

FIG. 8 is a block diagram illustrating an apparatus for sending system information according to an embodiment.

The apparatus is applied to a base station. As shown in FIG. 8, the apparatus for sending system information includes: a first receiving module 810, configured to receive a random access request carrying a pilot code of to-be-requested system information sent by user equipment; a message generating module 820, configured to generate a response message with a preset format based on a request message received by the first receiving module 810; and a third sending module 830, configured to send the response message generated by the message generating module 820.

Figure 9:
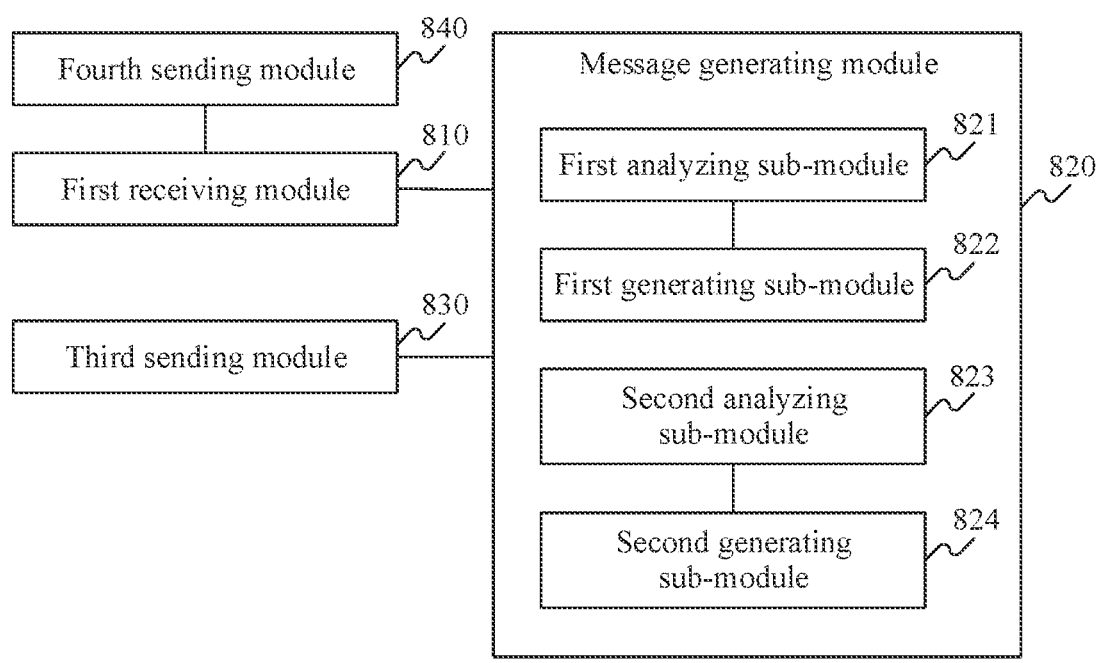
FIG. 9 is a block diagram illustrating an apparatus for sending system information according to an embodiment.

FIG. 9 is a block diagram illustrating an apparatus for sending system information according to an embodiment. As shown in FIG. 9, on the basis of the embodiment shown in FIG. 8, the message generating module 820 includes: a first analyzing sub-module 821, configured to analyze the pilot code of the to-be-requested system information from the request message; and a first generating sub-module 822, configured to obtain the response message with the preset format by adding a pilot code identifier of the pilot code of the to-be-requested system information which is determined for response, to a sub-packet header of the response message.

In an embodiment, the message generating module 820 includes: a second analyzing sub-module 823, configured to analyze the pilot code of the to-be-requested system information from the request message; and a second generating sub-module 824, configured to obtain the response message with the preset format by setting a number of pilot codes of the to-be-requested system information for response or a length of a packet body of the response message in a packet header of the response message, and adding a pilot code identifier of the pilot code of the to-be-requested system information for response to the packet body of the response message.

In an embodiment, the packet header of the response message further includes indicative information for indicating a structure type of the response message.

In an embodiment, the apparatus further includes: a fourth sending module 840, configured to send the to-be-requested system information for response within a transmission window of to-be-requested system information.

Regarding the apparatuses illustrated in the above embodiments, the specific manner in which the respective modules perform operations has been described in detail in the method embodiments, which will not be repeated here.

Figure 10:
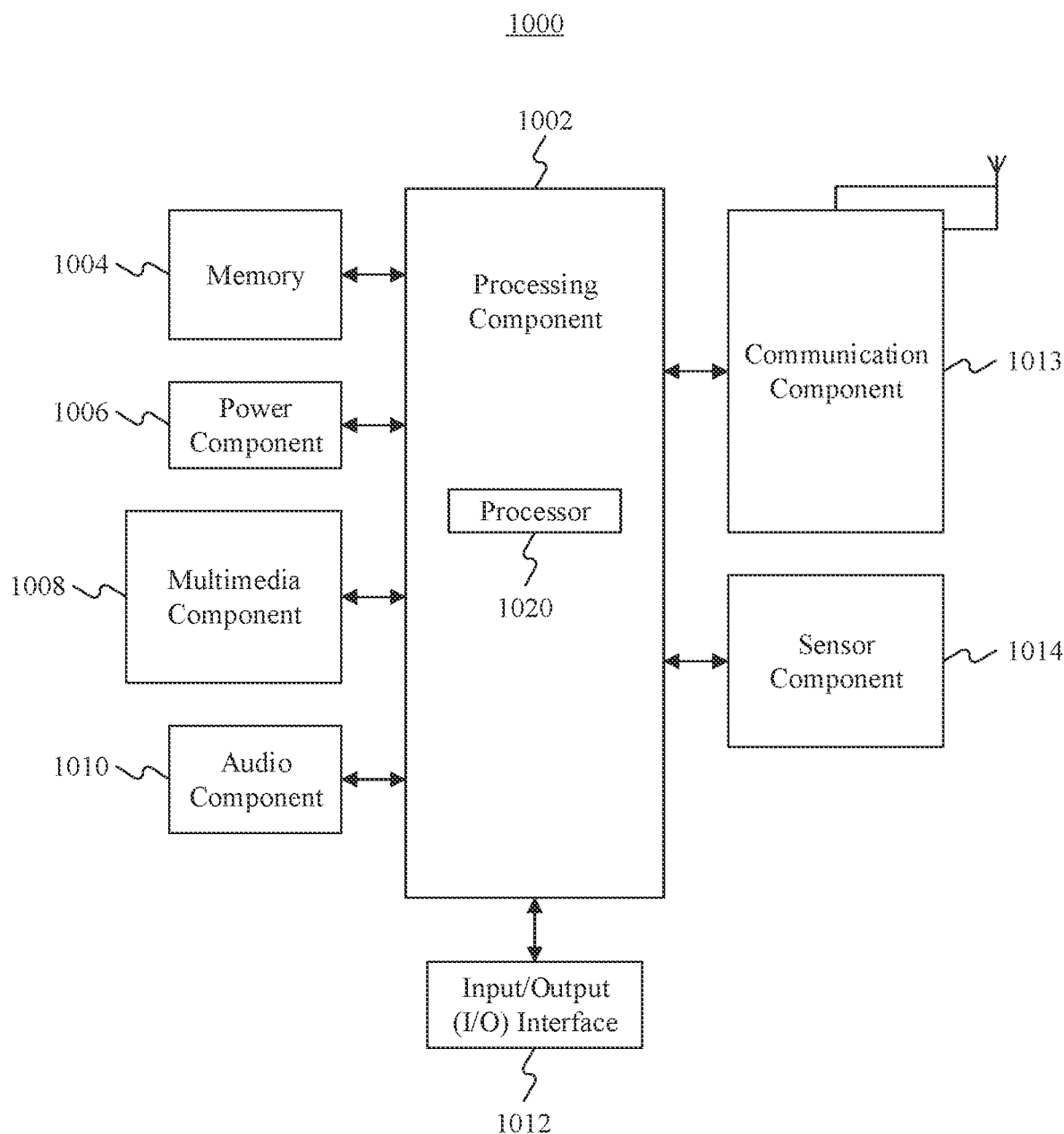
FIG. 10 is a schematic diagram illustrating an apparatus for requesting system information according to an embodiment.

FIG. 10 is a schematic diagram illustrating an apparatus 1000 for requesting system information according to an embodiment. For example, the apparatus 1000 may be a mobile telephone, a computer, a digital broadcasting terminal, a message receiving and transmitting device, a game console, a tablet device, a medical device, a fitness device, a personal digital assistant, and so on.

Referring to FIG. 10, the apparatus 1000 may include one or more of the following components: a processing component 1002, a memory 1004, a power supply component 1006, a multimedia component 1008, an audio component 1010, an input/output (I/O) interface 1012, a sensor component 1014 and a communication component 1013.

The processing component 1002 generally controls overall operations of the apparatus 1000, such as operations associated with display, phone calls, data communications, camera operations, and recording operations. The processing component 1002 may include one or more processors 1020 to execute instructions to complete all or part of the steps of the above methods. In addition, the processing component 1002 may include one or more modules which facilitate the interaction between the processing component 1002 and other components. For example, the processing component 1002 may include a multimedia module to facilitate the interaction between the multimedia component 1008 and the processing component 1002.

The memory 1004 is to store various types of data to support the operation of the apparatus 1000. Examples of such data include instructions for any application or method operated on the apparatus 1000, contact data, phonebook data, messages, pictures, videos, and so on. The memory 1004 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 1006 provides power to different components of the apparatus 1000. The power supply component 1006 may include a power management system, one or more power supplies, and other components associated with generating, managing, and distributing power for the apparatus 1000.

The multimedia component 1008 includes a screen providing an output interface between the apparatus 1000 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some embodiments, the multimedia component 1008 may include a front camera and/or a rear camera. The front camera and/or rear camera may receive external multimedia data when the apparatus 1000 is in an operating mode, such as a photographing mode or a video mode. Each of the front camera and the rear camera may be a fixed optical lens system or have focal length and optical zooming capability.

The audio component 1010 is to output and/or input an audio signal. For example, the audio component 1010 includes a microphone (MIC). When the apparatus 1000 is in an operating mode, such as a call mode, a recording mode, and a voice recognition mode, the MIC is to receive an external audio signal. The received audio signal may be further stored in the memory 1004 or sent via the communication component 1013. In some embodiments, the audio component 1010 further includes a speaker to output an audio signal.

The I/O interface 1012 may provide an interface between the processing component 1002 and peripheral interface modules. The above peripheral interface modules may include a keyboard, a click wheel, buttons and so on. These buttons may include, but are not limited to, a home button, a volume button, a starting button and a locking button.

The sensor component 1014 includes one or more sensors to provide status assessments of various aspects for the apparatus 1000. For example, the sensor component 1014 may detect the on/off status of the apparatus 1000, and relative positioning of component, for example, the component is a display and a keypad of the apparatus 1000. The sensor component 1014 may also detect a change in position of the apparatus 1000 or a component of the apparatus 1000, a presence or absence of the contact between a user and the apparatus 1000, an orientation or an acceleration/deceleration of the apparatus 1000, and a change in temperature of the apparatus 1000. The sensor component 1014 may include a proximity sensor to detect the presence of a nearby object without any physical contact. The sensor component 1014 may further include an optical sensor, such as a Complementary Metal-Oxide-Semiconductor (CMOS) or Charged Coupled Device (CCD) image sensor which is used in imaging applications. In some embodiments, the sensor component 1014 may further include an acceleration sensor, a gyroscope sensor, a magnetic sensor, a pressure sensor, or a temperature sensor.

The communication component 1013 is to facilitate wired or wireless communication between the apparatus 1000 and other devices. The apparatus 1000 may access a wireless network that is based on a communication standard, such as Wi-Fi, 4G or 5G, or a combination thereof. In an embodiment, the communication component 1013 receives a broadcast signal or broadcast-associated information from an external broadcast management system via a broadcast channel. In an embodiment, the communication component 1013 further includes a Near Field Communication (NFC) module to facilitate short-range communications. In an embodiment, the communication component 1013 may be implemented based on a Radio Frequency Identification (RFID) technology, an Infrared Data Association (IrDA) technology, an Ultra Wideband (UWB) technology, a Bluetooth® (BT) technology and other technologies.

In an embodiment, the apparatus 1000 may be implemented by one or more Application Specific Integrated Circuits (ASICs), Digital Signal Processors (DSPs). Digital Signal Processing Devices (DSPDs), programmable Logic Devices (PLDs), Field Programmable Gate Arrays (FPGAs), controllers, microcontrollers, microprocessors, or other electronic components for performing the above methods.

In an embodiment, there is also provided a non-transitory computer-readable storage medium including instructions, such as the memory 1004 including instructions. The instructions may be executed by the processor 1020 of the apparatus 1000 to perform the above described methods, including the following steps: sending a first random access request, wherein the first random access request carries at least one pilot code for identifying to-be-requested system information; monitoring a response message corresponding to the first random access request within a preset time period, where the response message carries information for responding to the pilot code; and when the response message is detected, based on a pilot code identifier included in the response message, monitoring and receiving the to-be-requested system information within a transmission window of to-be-requested system information corresponding to the pilot code identifier.

Figure 11:
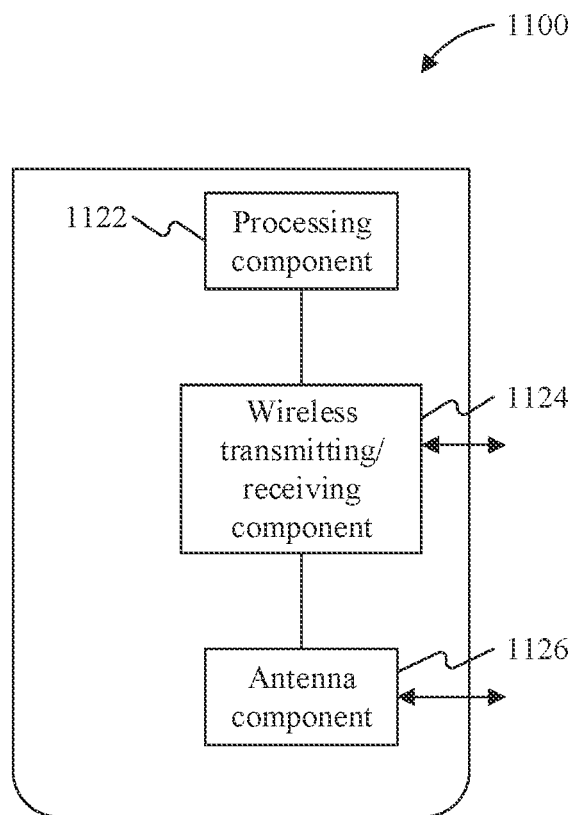
FIG. 11 is a schematic diagram illustrating an apparatus for sending system information according to an embodiment.

FIG. 11 is a schematic diagram illustrating an apparatus for sending system information according to an embodiment. The apparatus 1100 may be provided as a base station. Referring to FIG. 11, the apparatus 1100 includes a processing component 1122, a wireless transmitting/receiving component 1124, an antenna component 1126 and a signal processing component specific to a wireless interface. The processing component 1122 may further include one or more processors configured to perform the above described methods.

In an embodiment, the processing component 1122 may be configured to: receive a random access request carrying a pilot code of the to-be-requested system information sent by user equipment; generate a response message with a preset format based on a request message; and send the response message.

In an embodiment, a non-transitory computer-readable storage medium including instructions is also provided. The non-transitory computer-readable storage medium stores instructions that, when executed by a processor of an apparatus, cause the apparatus to implement the following steps including: receiving a random access request carrying a pilot code of the to-be-requested system information sent by user equipment; generating a response message with a preset format based on the random access request; and sending the response message.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The described embodiments are exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of requesting system information, comprising:
    sending a random access request by transmitting MSG1, wherein the random access request carries at least one random access preamble for identifying system information to be requested;
    monitoring a random access response message corresponding to the random access request within a preset time period, wherein the random access response message carries a random access preamble identifier corresponding to the at least one random access preamble; and
    receiving, based on the random access preamble identifier included in the random access response message, system information corresponding to the random access preamble identifier within a transmission window,
    wherein the random access response message includes one or more sub-packet headers and does not include a packet body, and the random access preamble identifier is carried by a sub-packet header of the random access response message.

2. The method according to claim 1, wherein the random access response message is a message received after the transmitting of the MSG1.

3. User equipment comprising:
    a processor; and
    a memory to store instructions executable by the processor;
    wherein the processor is configured to:
        send a random access request by transmitting MSG1, wherein the random access request carries at least one random access preamble for identifying system information to be requested;
        monitor a random access response message corresponding to the random access request within a preset time period, wherein the random access response message carries a random access preamble identifier corresponding to the at least one random access preamble; and receive, based on the random access preamble identifier included in the random access response message, system information corresponding to the random access preamble identifier within a transmission window, wherein the random access response message includes one or more sub-packet headers and does not include a packet body, and the random access preamble identifier is carried by a sub-packet header of the random access response message.

4. The user equipment according to claim 3, wherein the random access response message is received after the transmitting of the MSG1.

\* \* \* \* \*